Aug. 6, 1935.  R. B. FAGEOL  2,010,630
FRUIT JUICE EXTRACTING APPARATUS
Filed April 8, 1932  2 Sheets-Sheet 1
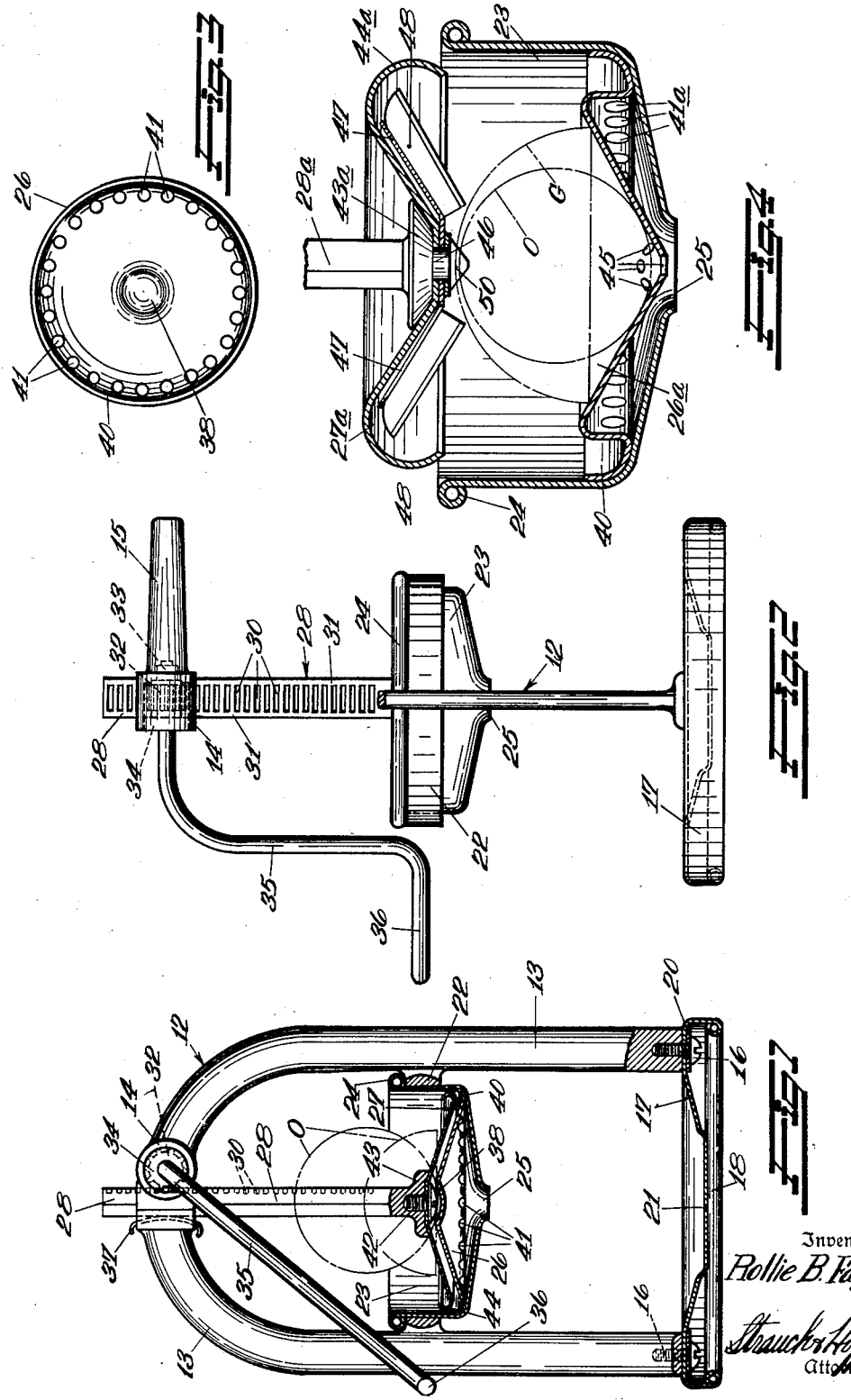
Inventor
Rollie B. Fageol
Strauch & Hoffman
Attorneys Aug. 6, 1935.  R. B. FAGEOL  2,010,630
FRUIT JUICE EXTRACTING APPARATUS
Filed April 8, 1932  2 Sheets-Sheet 2
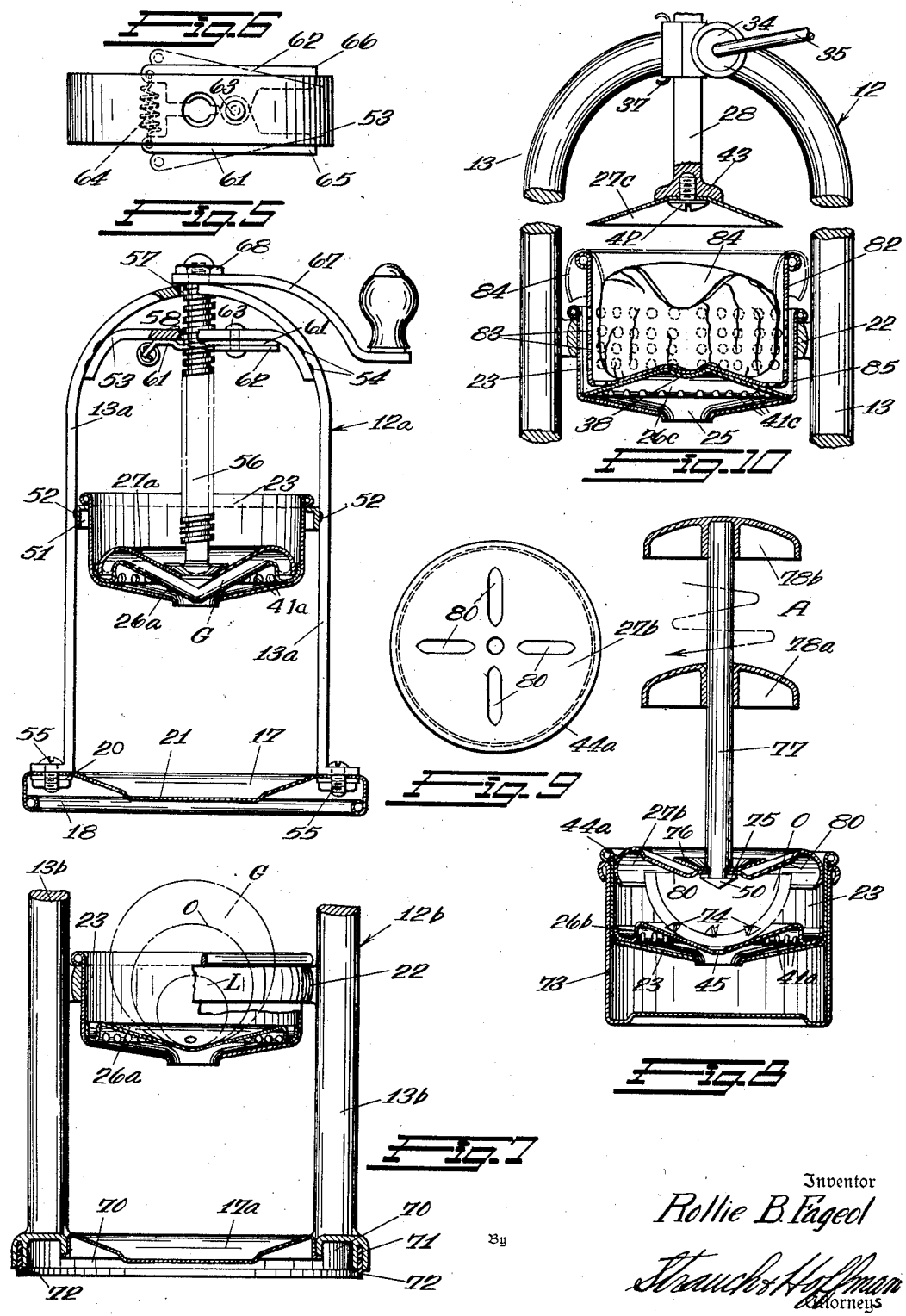
Inventor
Rollie B. Fageol
By
Strauch & Hoffman
Attorneys Patented Aug. 6, 1935

2,010,630

UNITED STATES PATENT OFFICE 2,010,630

FRUIT JUICE EXTRACTING APPARATUS

Rollie B. Fageol, Los Angeles, Calif.

Application April 8, 1932, Serial No. 604,071

5 Claims. (Cl. 100—44)

The present invention relates to methods and apparatus for extracting or squeezing the juices from natural food products. The invention is particularly concerned with the extraction of juices from fruits, especially citrus fruits.

It is the primary object of my invention to devise novel methods and apparatus for quickly, easily and effectively removing the juices, in pure and clear form, from the fruits in which they are contained. It is a special object to provide an extracting device having this advantage, and yet which shall be relatively simple in design, low in cost, easy to assemble and take apart and easy to clean.

Prior marketed and patented juice extractors are open to a number of objections, chief among which are that they can not be successfully adapted to handle more than one particular food product; that they permit some of the juice to be spilled or squirted in an undesirable manner during the squeezing operation; that they fail to accurately receive and hold the product to be squeezed; and that they permit objectionable quantities of pulp and rind oil to be discharged along with the juice. Most of the known types of extractors are subject to at least two of these objections.

The reamer types of extractors, comprising a rotary element manually or power operated to force the juice from a halved orange or the like, extract a cloudy liquid containing excessive rind oil and pulp. This mixture has an undesirable appearance and most people dislike its taste; and some of the loosened pulp tends to absorb the juice and to clog the drainage outlets, thus preventing efficient extraction. The extractor of the present invention is of the reciprocating plunger or direct squeezing type, with little or no reaming action. I am aware of the fact that cider presses are old and that it has already been proposed to provide various types of juice extractors operating on the broad principle of the cider press; but I know of none which is not open to some of the aforementioned objections or which accomplishes the objects stated below.

It is a major object of the present invention to devise a simple form of fruit press which can satisfactorily handle a variety of juicy fruits and like products, inserted either in whole or in section; and which will extract substantially all of the juices, in clear and unadulterated form and without spilling or squirting them out of the fruit receptacle.

Other important objects, subordinate to that just stated, are: To equip a press with holding and squeezing means that will automatically position the fruit and that will prevent the application of excessive final pressures; to provide a squeezing means having complemental fruit-engaging surfaces at least one of which is designed to prevent rind oil from following in excess into the extracted juice, and which are designed to prevent pulp and seeds from choking or escaping from the discharge apertures and yet to prevent undue absorption of juice by the restrained pulp; and to equip a press with a movable pressure plate designed to cooperate with the fruit receptacle in such manner as to prevent the outward and upward escape of juice during the squeezing operation.

Further objects of this invention are to provide an improved frame and base structure for a juice extractor, and improved mechanisms and arrangements for applying power to the squeezing means.

It is another major object of my invention to devise a juice extractor that will press berries and small fruit, as well as the larger articles such as oranges, grapefruit, etc., and to accomplish this object I preferably provide interchangeable or additional parts that may be used in a standard form of press.

These and other important objects of the present invention will fully appear upon a study of the following detailed description and appended claims when taken in conjunction with the accompanying drawings, wherein:

Figure 1 is a side elevation, with some of the parts in central vertical section, of a preferred embodiment of the present invention.

Figure 2 is a side elevation of the same embodiment, as seen when looking toward the right side of Figure 1.

Figure 3 represents a top plan view of the stationary squeezing plate seen in Figures 1 and 2.

Figure 4 is an enlarged vertical section of a modified form of squeezing means, adapted for use with the bowl of Figures 1 and 2.

Figure 5 illustrates a further modified form of squeezing means, in combination with a second type of framework and power application mechanism.

Figure 6 represents a top plan view of a portion of the power application mechanism of Figure 5.

Figure 7 is a fragmentary view, in substantially central vertical section, of a modified form of supporting base.

Figure 8 discloses, in vertical section, a further embodiment comprising a gearless and frameless extractor.

Figure 9 is a plan view of the movable pressure plate of Figure 8.

Figure 10 is a fragmentary view in partial section, showing the extractor of Figure 1, converted into a press for squeezing berries, tomatoes, kraut, etc.

It will readily be understood that most of the principles and parts embodied in the several illustrated modifications may be interchangeably utilized in the several forms.

With continued reference to the drawings, wherein like numerals are employed to designate like parts, and with particular reference for the moment to that embodiment illustrated in Figures 1–3:

A special one-piece framework 12 is provided comprising a pair of uprights 13 meeting at their upper ends in the form of an arch that carries, slightly off center, a transversely disposed journal member 14 having an integral smooth extension 15. The lower ends of the uprights are enlarged and internally threaded for cooperation with concealed screws 16 that are utilized to firmly hold the framework upon a stamped circular supporting base 17.

The edges of the sheet metal base 17 are flanged and beaded at 18 to provide a smooth bottom for engagement with any flat supporting surface. An annular reenforcement ring 20 is positioned between the base and the screw heads. The central portion of the stamping is depressed to form a platform 21 designed to receive a drinking glass or similar receptacle into which extracted juice may be discharged by gravity.

Intermediate the base and the arch, the framework includes an integral horizontal ring 22 which is joined at diametrically opposed points with the uprights 13. This ring provides a firm circular support for a stationary stamped bowl 23 that is shaped to have cylindrical side walls for internal engagement with the ring and to have an upper beaded edge 24 which rests upon the ring. The bowl is thus snugly held by the ring but can be readily lifted away from the latter. The bottom of the bowl is concave and provided with a central discharge port 25 for delivering the collected extracted juice to the receptacle carried by the platform 21.

The squeezing means comprises a pair of pressure plates 26 and 27, the former of which is stationarily supported in the bowl 23 and the latter of which is secured on the lower end of a vertically reciprocating rack 28. The rack is guided vertically by the arched part of the framework 12. Its toothwork is formed by a series of spaced recesses 30 which terminate short of the edges of the recessed face and thus leave a pair of vertical ribs 31 flush with the original surface plane of the recessed side.

The journal member 14 of the framework is axially hollowed to receive and rotatably support a pinion 32 and its axial bearing extensions 33 and 34, which elements are integrally formed or secured on one end of a crank 35 that has a handle 36. The pinion teeth of course are designed to mate with the recesses 30 of the rack whereby, upon rotation of the handle in counter-clockwise direction in Figure 1, the pressure plate 27 will be moved downwardly. A flat spring 37 is inserted between the rack and its guideway in such manner as to urge the rack and pinion into complete and noiseless meshing engagement. The spring is held in position by having its ends bent outwardly at right angles. It further functions to impose a yielding frictional resistance to rack reciprocation, this resistance being sufficient to prevent the rack from moving downwardly inadvertently after the plate 27 has been raised to permit the insertion of fruit between the pressure plates.

The rack ribs 31 engage the ends of certain pinion teeth and thus prevent axial movement of the pinion, and it follows that the handle 35 is locked in assembled position whenever the rack and pinion teeth are in mesh. The gear assembling operation is performed, prior to the addition of the bowl 23, by inserting the upper end of the rack in the lower end of its guideway, and thereafter cranking the rack upwardly until the bowl can be placed in position. It will be seen, therefore, that both the rack and the handle may be readily assembled and disassembled for packing and cleaning purposes but that, due to the height of the bowl 23, it is impossible for these parts to become accidentally dislocated when the device is being used.

As illustrated in Figures 1 and 2, the arrangement and relationship of parts preferably is such that, when the plate 27 approaches the plate 26 to put final pressure on the squeezed article, the handle 36 will be in a rather low position so that the force exerted by the right hand of the operator will have a downward component urging the entire apparatus against its horizontal support and a rotative component that will be naturally balanced by the force exerted by the left hand upon the frame extension 15. That is, any tendency for the cranking action to swing or upset the entire framework will be substantially counterbalanced by the force quite naturally applied by the left hand, thus causing the plate 27 to be urged downwardly to develop very high pressure when desired. The final relative position of the crank handle can be readily altered to suit the operator, merely by choosing a proper angular position of the same when the rack is assembled into mesh with the pinion.

The stationary pressure plate 26 is shaped somewhat like a short cone having its vertex depressed to form a spherically curved concave seat 38 which automatically serves to center and hold a fruit in position for squeezing. For example, there is shown in Figure 1 the outline of a whole orange O seated in the concavity, and also the hemispherical outline of a halved orange that has its cut surface facing downwardly for support on the horizontal circular edge of the seat. The rim of the plate is uniformly bent upwardly at 40 for a snug complemental fit within the angle formed by the side wall and bottom of the bowl 23. This frictional fit causes the plate to be held in horizontal position, while permitting it to be readily withdrawn for cleaning.

The convexity of the plate 26 is highly desirable for several reasons. It enables the plate to be made of a single light stamping and yet to withstand great downward pressures. This strength of course is made possible because the bowl engages the plate rim and prevents the latter from increasing in diameter. The convexity further facilitates the proper extraction and drainage of the fruit juice. It is desirable that the extracted juices flow radially outwardly and then be removed through discharge ports that are not subject to clogging by the seed and pulp of the fruit. It is partly for this reason that the central area of the plate is left imperforate and that a circular series of drainage apertures 41 is provided in the rim portion of the plate where no solid part of the fruit ordinarily will be extended during the squeezing operation. The degree of slope need not be very large for ensuring drainage in the illustrated arrangement, and preferably is given a minimum value so that seeds and pulp will not tend to slide down the incline and so that the fruit will not be supported initially at a point too high above the drainage level. It is undesirable, especially when a whole fruit is being squeezed, to have the seat 38 at a high level because juice would then squirt outwardly from the bursting rind or skin toward points outside the bowl 23. A high seat would therefore require a deep bowl, with resultant increased height of the entire apparatus due to the need for a given amount of space through which to insert the fruit when the top plate 27 is raised.

The movable pressure plate 27 is formed from a single stamping that is given substantially the same degree of convexity as the stationary plate. At its center it is flattened for cooperation with the lower end of the rack, and although it might readily be permanently secured to the latter, a removable screw 42 preferably is utilized for this purpose, for reasons appearing later. The lower end of the rack is enlarged at 43 to strengthen the joint and to increase the rigidity of the central portion of the convex area. The plate 27 is not very flexible, but it will yield upwardly to a slight extent,—this yield increasing gradually toward the peripheral edge of the plate. It follows that, during the final squeezing operation, a greater force of pressure is applied centrally and that this pressure gradually decreases in the radially outward directions. The advantage of this function is that the juice, instead of being partially trapped near the center, will first be removed from the center and then be uniformly urged radially in the direction of desired drainage for ultimate discharge through the fringed apertures 41. Due to the slight upward yield of the convex plate portion, the pulp and rind of the fruit will not be so tightly compressed or choked adjacent the rim portions of the plates as to prevent the juice from flowing outwardly.

The rim 44 of the movable plate is of approximately the same diameter as that of the stationary plate, not only for the purpose of accomplishing the important result explained above, but also to ensure that none of the juice shall escape from the confines of the bowl and that substantially none of the juice shall flow over the plate 27 during the final squeeze. The rim 44 is complemental to the rim 40 and engages the inner upper edge of the latter to seal it against material upward juice flow. Since the upper plate is imperforate and since most of the juice has been extracted and discharged, prior to this final squeeze, it will be seen that the completed squeezing operation is highly efficient from the standpoint of thorough extraction. The convex upper plate acts as a hood for the fruit and assists in centering the latter during the first part of the pressing operation and its rim 44 will have sealed the upper edge of the bowl by the time that the fruit has been deformed sufficiently to squirt juice from its ruptured rind, pulp or skin.

If desired, the bent rim 44 may be eliminated in favor of a conical rim forming a straight extension of the convex plate portion, thus ensuring that no juice can be trapped above the upper plate. In like manner, the rim 40 may be eliminated so that the convex plate 26 extends directly into engagement with the line of jointure of the side and bottom walls of the bowl, in which event the apertures 41 would preferably take the form of radial slots in the edge of the plate. This suggested modification is partially disclosed in the apparatus of Figure 10 (later to be described).

The head of the screw 42 preferably is of sufficient thickness to prevent the squeezing plates from closing a predetermined gap left between their convex surfaces for the accommodation of the waste material. Otherwise, the leverage gained by the rack and pinion assembly might be used to produce a final pressure so high as to extract excessive rind oil or remove undesirable substances from the compressed fruit.

The large, blank fruit-engaging surfaces of the two plates also assist in preventing the discharge of undesirable by-products into the collected juice. For example, rind oil can not escape through the plates and, in seeking its way toward the plate rims, will in part adhere to the gradually expanding blank areas. These blank areas, moreover, are very smooth, preferably having a polished chromium finish, and hence tend to seal the oil against escape from the small pockets in the skin of the fruit.

The present invention preferably embodies no cutting knives. None are necessary in the form of apparatus just described. In some instances, however, especially when pressing articles which have tough or hard surfaces or which will not readily rupture into condition for a subsequent uniform squeeze, it may be desirable to provide a cutting means. I have found that when cutting blades are used they are more effective and permit the fruit to be inserted with greater facility when they are movably carried by the plunger than when they are supported by the straining bowl. This preferred knife combination is illustrated merely by way of example in Figure 4, which figure is primarily intended to show a number of other modified features.

The bowl 23 of Figure 4 may be supported by the framework of Figure 1 and the rack bar 28a may be reciprocated as in Figure 1. The stationary squeezing plate 26a has a curved rim portion 40 fringed by apertures 41a, and differs chiefly from the plate of Figure 1 in that it is centrally concave. This concavity requires the provision of additional drainage apertures 45 at the center of the plate for discharging a part of the juice that resists uphill flow toward the rim.

The upper pressure plate, 27a, likewise is stamped in concave form, with approximately the same slope as on the lower plate. The rim 44a is flared downwardly to baffle the escape of squirted juice. The rack has an enlargement 43a shaped for cooperation with the concave plate. The enlargement has an integral pin 46 that passes through the plate and through a second concave plate 47 that has two or more knife blades 48 struck downwardly from it in vertical planes. The free end of the pin is upset at 50 to secure the plates in position and to provide a point which will pierce the fruit and thus assist in centering the latter at the start of the pressure stroke. Obviously, the pin may be replaced by a detachable screw as in Figure 1, to permit use of the press with or without the cutting knives.

The blades 48 are of insufficient depth to completely sever the fruit into several sections that are difficult to remove after the completed squeeze. Instead, these blades merely gash the fruit so that it will crush readily and spread uniformly. It should be noted that the blades are substantially concealed and that, being on the movable plate, they do not interfere with the convenient insertion and centering of the fruit.

The modified form of press seen in Figures 5 and 6 embodies an alternative type of framework, and a power application means of the screw and nut type for providing greater force multiplication. Although a citrus fruit is shown in the illustration, this embodiment is designed primarily for pressing apples and the like.

The framework, 12a, consists of a strip of strap iron bent to form a pair of arched uprights 13a; a stamped bowl-supporting ring 51 secured, as by spot welding at 52, within the arched uprights; and a strengthening and bridging member comprising a stamping 53 having its curved ends welded at 54 in the upper part of the arch. The lower ends of the uprights are bent outwardly for cooperation with a base 17 to which they are secured by screw and nut assemblies 55.

The pressure plates 26a and 27a are duplicates of those illustrated in Figure 4, except for the removal of the knife 47. The plates are shown in final squeezing position, the halved grapefruit G of Figure 4 now being compressed and deformed into the shape of the gap between the plates. The skin of the fruit is engaged with the upper plate and the de-juiced pulp is engaged by the lower plate, and it should be observed that the coacting rims of the plates have prevented the retention of juice in the pulp that fringes the edge of the crushed fruit.

In lieu of the rack bar there is provided a centrally threaded rod 56 having its lower end secured to the plate 27a and having its upper end slidably guided vertically through the frame arch and the bridging member by way of holes 57 and 58 respectively. A pair of stampings 61 and 62 are pivotally connected intermediate their ends to the bridging member 53 by a pin 63, and their adjacent edges are designed to move substantially horizontally into portions of the thread grooves so that when the rod is rotated the sides of its threads will engage the vertically fixed stampings and thus cause linear movement of the rod. The stampings 61 and 62 thus form, in effect, a stationary nut.

The left ends of the thread-engaging stampings are drawn toward each other by a tension spring 64, the resistance of which can be overcome by pinching the opposite ends 65 and 66 of the stamping toward each other. This pinching operation will swing the stampings into the partially illustrated dotted line position of Figure 6, in which position they are out of engagement with the threaded rod. It will thus be seen that the two-part nut with its spring and pin pivot are utilized to permit rapid vertical movement of the rod without rotating the latter. This rapid movement is especially desirable when the pressure plates are to be separated after each squeezing operation.

The rod 56 is rotatable by means of a crank 67 that is rigidly, but detachably, secured thereto by a nut 68. It should be observed that the parts of the completed apparatus are so related and proportioned that, in the illustrated position of final squeeze, the crank has engaged the top of the framework arch to prevent a reduction of the pressure plate gap below a predetermined minimum size.

Figure 7 is inserted to show that the simple and inexpensive die-cast framework of Figures 1 and 2 may include the base, as well as the ring and other parts, in a one-piece construction. Here the framework 12b has uprights 13b which terminate at their lower ends in an integral base 70. The base is of ring shape and has a circular recess 71 formed vertically therein for the reception of a band 72 of cushioning and non-scratching material, such as rubber. A stamped tray 17a, for supporting the juice receptacle, is flanged for a pressed fit within the ring-shaped base.

A simpler form of apparatus than any yet described is disclosed in Figures 8 and 9, wherein no force multiplication means is utilized and wherein a stamped cup 73 forms the sole supporting structure and simultaneously serves as a juice receptacle. The bowl 23 has a sliding frictional fit within the cup and is designed to cooperate with any of the pressure plate combinations of this invention. For purposes of illustration, lower and upper plates, 26b and 27b respectively, similar to those of Figures 4 and 5, are disclosed.

The concave portion of the stationary plate 26b may have a number of triangular prongs 74 struck upwardly from its surface to provide holding elements that prevent the fruit from slipping when pressure is applied. These prongs preferably are so short that they project only part way through the rind of a fruit such as the orange O.

The upper plate 27b has a pair of reenforcing members 75 and 76 on opposite sides of its center and this assembly is secured to the lower end of an operating rod 77. A pair of knob-shaped grips 78a and 78b, designed to fit within the palms of the two hands, are secured upon the rod,—the former being rigidly positioned intermediate the rod ends and the latter being fastened upon the upper rod end. Vertical downward force alone may be insufficient to squeeze the fruit, due to lack of any mechanical advantage, and accordingly it is desirable to simultaneously impart a gyratory or nutational action to the knobs and rod, as indicated by the arrow A in Figure 8. For the purpose of increasing the effectiveness of this compound oscillatory and linear downward movement, several radiating ribs 89 are formed on the fruit-engaging side of the plate 27b for assistance in breaking down the fruit pulp and flattening the rind.

In the combination just described it will be observed that the curved rim 44a performs the additional function of providing a universal joint or seat between the upper plate and the bowl during the nutational operation of the rod and plate.

The quality or taste of the extracted juice will depend greatly upon the manner and shape in which the fruit is inserted prior to the pressing operation. By halving the fruit and properly centering and squeezing it, rind oil is substantially eliminated. Some people, however, like the taste of rind oil, and the juice can be so flavored by crushing whole fruit for the purpose of extracting an appreciable amount of the oils, or by utilizing knives for cutting the skin. All of the apparatus thus far described are capable of handling either whole or halved fruits, and the latter may be inserted in any one of several positions. As indicated in broken lines in the several views the fruit may take various shapes and sizes, in the form of lemons L, oranges O, and grapefruit G. Pomegranates and other similar food products may be squeezed with very satisfactory results. The device of Figure 8 works especially well on halved fruit with its rind engaging the lower plate; that of Figure 4 is especially adapted for squeezing halved fruit having its section face turned down; and the other apparatus, including the preferred form of Figures 1-3, is equally suitable for handling both whole and sectioned fruits in any of their various illustrated positions.

I have discovered that the universality of the above described extractors can be further augmented by providing an auxiliary container formed of finely woven or meshed material. For example,—tomatoes, berries and other products having very small seeds and flesh that is readily disintegrated under pressure, can be wrapt in muslin cloth and squeezed in any of the bowls 23 to produce clear and pure juice of excellent quality. Kraut juice and many other beverages also can be extracted by this method.

A preferred structural arrangement, for carrying out the above method, is illustrated in Figure 10. Although this arrangement embodies a foundation apparatus like that of Figure 1, it should be understood that the combination may be built up on any of the other disclosed forms. The foundation apparatus referred to comprises the framework 12 with its ring 22 for supporting the bowl 23; the rack 28 with its actuating mechanism; a convex stationary pressure plate 26c; and the detachable screw 42 for permitting the substitution of a modified movable pressure plate 27c for that of Figure 1.

An auxiliary strainer bowl 82 is nested within the bowl 23 and seated by gravity upon the plate 26c. The bottom of this added bowl is complemental to the curved surface of the plate and thus is stably and centrally supported by the latter. The cylindrical wall of the bowl has a plurality of discharge perforations 83 and is of lesser diameter than the bowl 23 so as to provide a vertical annular space for the free downward flow of extracted juices.

A sheet of muslin cloth 84 is provided as a liner for the perforated bowl 82, this muslin first being disposed with its edges overhanging the bowl rim as indicated in broken lines. After the muslin cup, thus formed, has been filled with tomatoes, berries, grapes or the like, the free edges of the cloth are folded over as shown to close the top of the cup, and the rack 28 is operated to bring the plate 27c downward for a complete squeezing operation. This plate is of substantially the same diameter as the inner surface of the bowl 82, and as it descends the created pressure causes juices to be thoroughly strained through the cloth and thence discharged through the series of ports 83, 41c and 25. A circular row of apertures 85 in the bowl bottom ensures complete drainage. The plasticity of the partially squeezed mass will cause the muslin to bulge outwardly against the apertures but this will not result in choking the latter to prevent drainage. The auxiliary bowl of course is provided to obtain more efficient drainage than could be obtained if the muslin were permitted to expand directly into surface engagement with the bowl 23.

The apparatus of Figure 10 can readily be converted back into a citrus fruit press by removing the bowl 82; and, if large fruits are to be squeezed, by further substituting a movable plate of larger diameter than the plate 27c.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a device for extracting juice from food products, a squeezing mechanism comprising a fixed member having a surface sloping downwardly and outwardly from the center for supporting the product, a movable member having a downwardly and outwardly sloping surface complemental to the surface of said fixed member, said movable member being substantially unyieldable centrally thereof but designed to have its outer portion slightly yieldable so that upon final pressure exerted on said fruit the yielding portion will cause a lesser pressure to be applied to the outer edges of the fruit than to the center thereof, whereby all of the juice will be forced from the center outwardly.

2. In the combination as set forth in claim 1, said fixed member having a concave depression centrally thereof to automatically maintain said fruit in position.

3. In the combination as set forth in claim 1, said fixed member having a curved peripheral portion provided with openings and said movable member having a complementally curved rim for cooperating therewith to extract juice from the fringe of the mass of crushed fruit during the final squeeze.

4. A convertible juice extracting apparatus, comprising a supporting structure, a juice collecting device mounted on said structure, said device having an open top, imperforate annular side wall, and a perforated downwardly concave platform detachably fitted within said collecting device with its edges engaging the latter between the bottom and side walls thereof, said platform having a depression centrally thereof to position a food product or a container therefor; a vertically movable pressure member designed to be moved downwardly through said open top for squeezing cooperation with said platform, a cup-shaped container having a perforated annular wall of less diameter than the wall of said collecting device and having a bottom designed to complementally engage said platform for locating the latter in spaced relation to the side wall of said collecting device; whereby said apparatus is convertible for various types and sizes of fruits and the like.

5. A juice extractor including a container, a removable presser plate arranged in said container and normally resting on the bottom thereof, said presser plate comprising a disk-shaped member provided with a plurality of apertures arranged nearer the periphery than the center, said plate having its outer edge curled upwardly and the center part bulged upwardly with a central depression, and means coacting with said presser plate and said container for compressing an article.

ROLLIE B. FAGEOL.